Oct. 12, 1954  W. P. DALRYMPLE  2,691,437
CENTRIFUGALLY AND MANUALLY OPERATED SERVO CLUTCH
Filed June 30, 1951  2 Sheets-Sheet 1
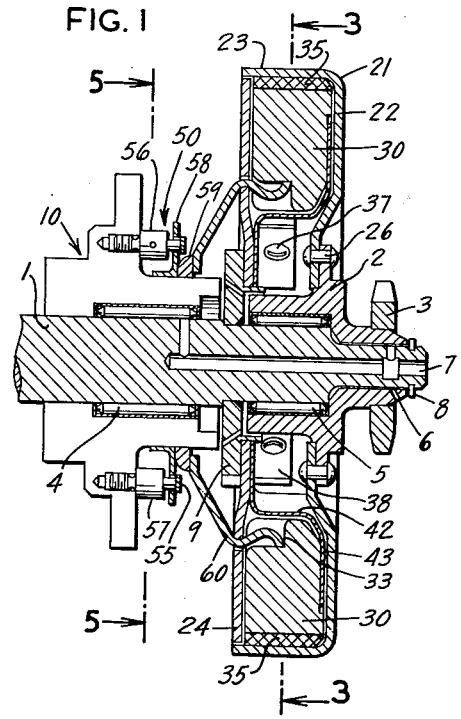
FIG. 1
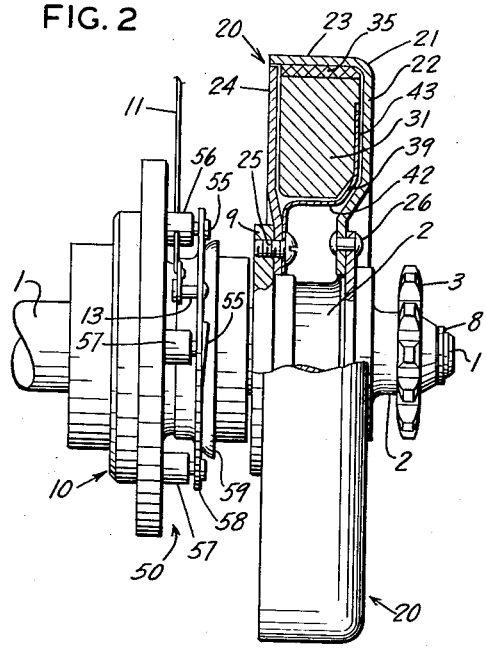
FIG. 2
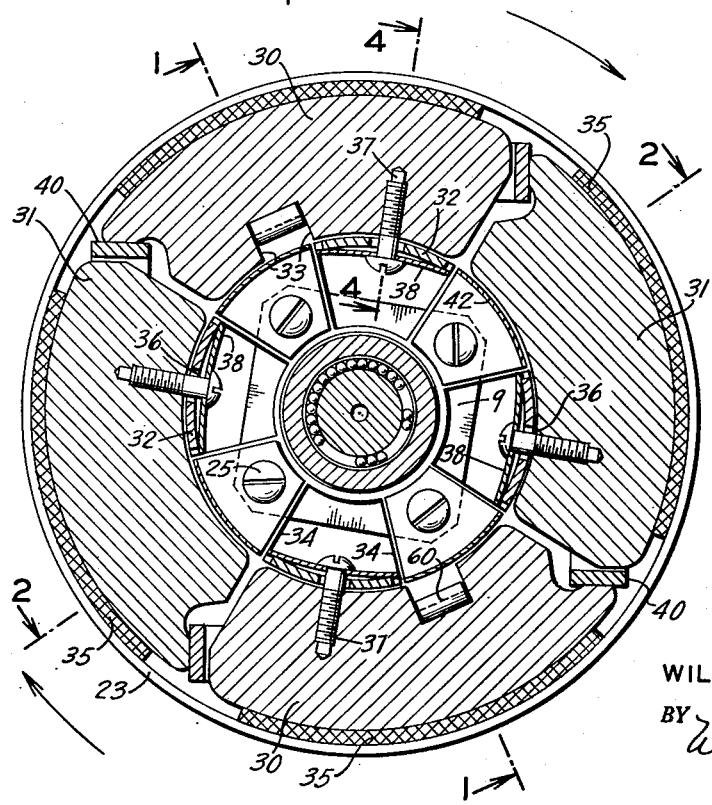
FIG. 3
FIG. 4
INVENTOR.
WILLIAM P. DALRYMPLE
BY Wallace and Cannon
ATTORNEYS

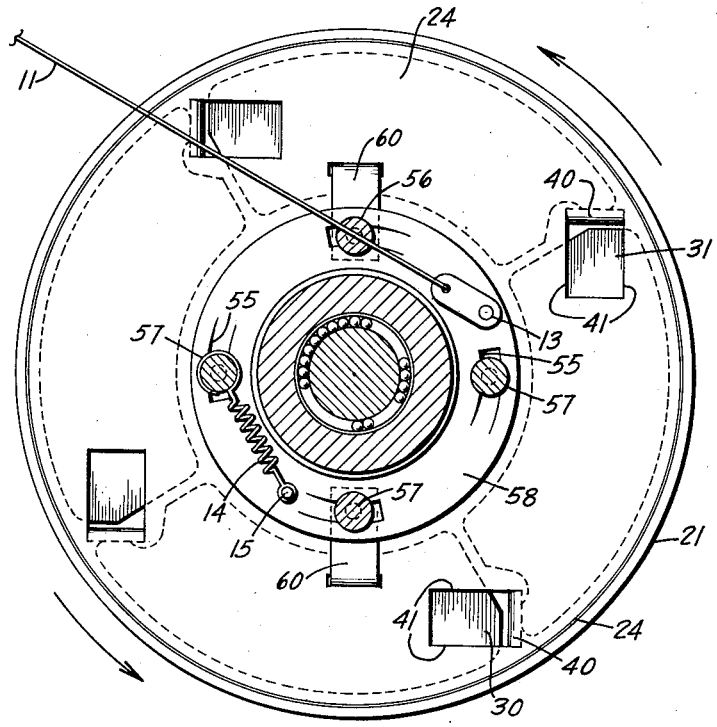
FIG. 5
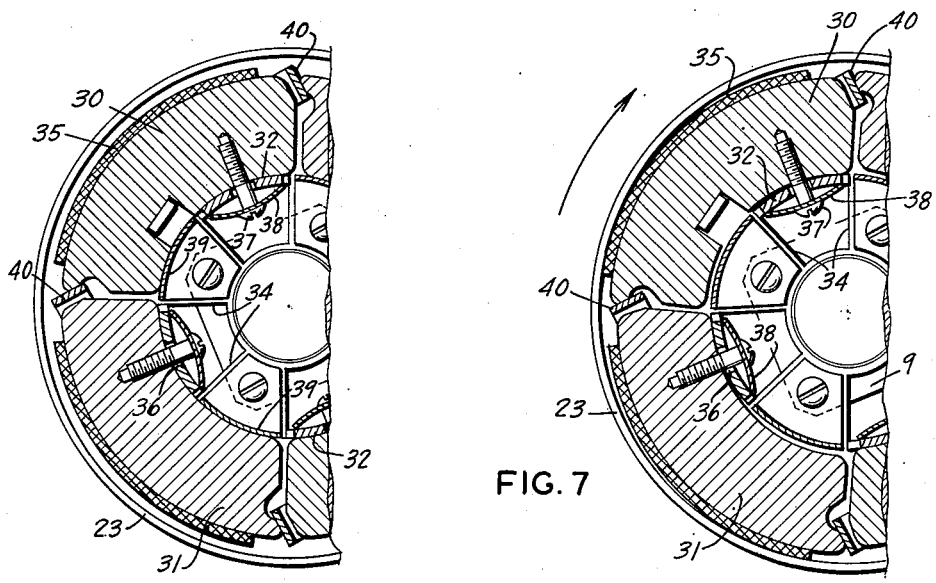
FIG. 6
FIG. 7
INVENTOR.
WILLIAM P. DALRYMPLE
BY Wallace and Cannon
ATTORNEYS Patented Oct. 12, 1954

2,691,437

UNITED STATES PATENT OFFICE 2,691,437

CENTRIFUGALLY AND MANUALLY OPERATED SERVO CLUTCH

William P. Dalrymple, Rochester, N. Y., assignor to American Brake Shoe Company, Wilmington, Del., a corporation of Delaware Application June 30, 1951, Serial No. 234,569

8 Claims. (Cl. 192—105)

This invention relates to clutches and more specifically to that type in which a main driving means and a main driven means are coupled by clutch members so disposed within a housing as to be centrifugally actuatable.

Ordinarily in clutches of the above mentioned type, clutch engagement is instantaneous when centrifugal forces extant in the clutch members reach a certain magnitude. Thus, due to automatic actuation, there is presented the possibility of a sudden, jarring engagement, and it is therefore a primary object of this invention to provide means that afford a differential, progressive point-to-point clutch engagement. It is a further object of this invention to provide means for wedging the clutch members firmly into engagement.

Particularly in cases where clutches of the above mentioned type are to be used in light vehicles such as motorbikes, it is desirable that the clutch members be manually engageable. It is therefore an object of this invention to permit selected ones of the clutch members to be manually actuated. It is a further object of this invention to provide an automatic load release in clutches of the above mentioned type.

Still a further object of this invention is to provide a novel arrangement of parts whereby the objects above may be utilized singly or in combination.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a vertical sectional view taken axially through the clutch embodying the features of the present invention;

Fig. 2 is a plan view taken along the line 2—2 of Fig. 3 and showing part of the clutch housing in vertical section;

Fig. 3 is a vertical section taken along the line 3—3 of Fig. 1 and showing the clutch in engaged position;

Fig. 4 is a fragmental vertical section taken along the line 4—4 of Fig. 3;

Fig. 5 is a vertical section taken along the line 5—5 of Fig. 1 and showing the manual actuating means in plan;

Fig. 6 is a vertical sectional view in part, similar to Fig. 3, and showing the clutch in non-engaged position; and Fig. 7 is a view similar to Fig. 6 showing the commencement of clutch engagement.

The clutch of the present invention is shown in Figs. 1–7 as comprising a clutch housing, in the form of an annular cavity and generally indicated at 20, surrounding an intermediate section of a main driving shaft 1 and containing means to couple the latter to a main driven shaft 2 concentrically mounted on shaft 1 for free rotation thereabout. For purposes of illustration, a sprocket drive 3 is shown as secured to shaft 2 thus constituting a part of the driven means. Shaft 1 is driven from a main power supply not shown, and sprocket drive 3 can be connected to any desirable final driven means such as the rear wheel of a conventional motorbike. It will be understood from the discussion to follow, however, that the clutch arrangement of the present invention can be utilized with almost any type of drive in which it is desired to provide for both manual and automatic engagement and dis-engagement between the driven means and the driving means.

The driving shaft 1 is shown as free to rotate, with the aid of needle bearings 4, within the main bearing housing generally indicated at 10, the latter also constituting a mounting for manual clutch actuating means generally indicated at 50, hereinafter to be described in more detail. Needle bearings 5, similar to bearings 4, are also provided to eliminate frictional contact between the facing surfaces of shafts 1 and 2, and openings such as 6 and 7 are afforded to permit lubrication of the moving parts. A C-washer 8, snapped into a grove at the free end of driving shaft 1, affords a convenient retaining means for driven shaft 2.

The housing means for the clutch assembly is generally indicated at 20, and is shown as comprising two circular, separately rotatable plates 21 and 24. Plate 21 is generally bowl-shaped in outline and consists of an annular portion or side 23 and a facing portion 22. Plate 21 is shown as rigidly secured to shaft 2 by rivets 26 so as to constitute part of the driven means, while plate 24 is secured, by means of screws 25, to the square driving plate 9, Fig. 3, the latter being welded fast to main driving shaft 1. Driven plate 21 and driving plate 24 together define in part an annular cavity in which are disposed a plurality of clutch members. Preferably, the clutch members are each connected with the driving means and are so seated within the clutch housing as to be engageable with the annular side 23 of plate 21 when forces tending to urge these clutch members radially outwardly are sufficient to overcome forces urging them radially inwardly. From the description given thus far, it can be seen that driven shaft 2 and the sprocket drive 3 welded thereto will be rotated with the main driving means when the clutch members are urged radially outwardly a slight distance within the annular cavity and into engagement with portion 23 of plate 21 in a manner presently to be described.

Referring to Figs. 1, 2 and 3, there are shown two pairs of arcuate, centrifugally engageable clutch members 30 and 31 mounted within the annular housing or cavity defined by the rotatable driving and driven plates 24 and 21, and in a position coupling these two plates. While the discussion to follow will naturally proceed along the lines of the preferred embodiment disclosed, it will be clear that changes in the number and arrangement of clutch members, their disposition and shape, and angulation and location of the various pivoting and urging means can be made to suit the particular adaptation and space available without departing from the scope of practice of the present invention. Thus, in the preferred embodiment, a maximum number of cooperating functions are provided in a minimum number of parts. From Fig. 3, it will be observed that the chord of each of the arcuate clutch members subtends an arc of approximately 87°, thus to provide symmetrically disposed spaces for the positioning of wedging means that force the clutch members into firm and steady engagement with plate 21. These means will later be described in more detail. It will also be observed from Fig. 3 that each of the clutch members carries a facing or lining of friction material 35, hereinafter referred to as the shoe, cemented or otherwise secured to the outer periphery thereof, and that the clutch members 30 are each provided with a recess 33 for reception of a pair of manually actuatable clutch-engaging means in the form of levers 60. The function of levers 60 will be described later in connection with the manual phase of operation.

The clutch members 30 and 31, carrying shoes 35, are so mounted within their housing that they will be rotated with shaft 1 by means of a connection to driving plate 24, and that when the speed of shaft 1 reaches a predetermined magnitude, will be centrifugally urged radially outwardly a slight distance into engagement with annular portion 23 of plate 21 and against forces normally tending to draw them into an innermost and non-engaging radial position. Additionally, since it is highly desirable that clutch engagement of this type be as smooth as possible and also free from chatter, means are provided within the clutch housing whereby differential engagement between the clutch members and driven plate 21 is effected.

In order that the clutch members 30 and 31 will be properly positioned within their housing and rotated with shaft 1, seating means and drive connections in the form of four radial flanges 32 are preferably struck out from driving plate 24 at approximately 90° intervals and extended into the annular cavity of the clutch housing, as shown in Fig. 4, leaving openings 34 in drive plate 24 of a general trapezoidal shape as shown in Fig. 3. Prior their being struck out, these flanges are each provided with an aperture 36 through which a connecting screw 37 is adapted to be passed into a threaded bore displaced away from the center of gravity in each of the clutch members, thus establishing a driving connection between the driving means and the clutch members. Also, in order that each of the clutch members will be normally urged radially inwardly and out of driving engagement with plate 21, as shown in Fig. 6, resilient tensioning means in the form of a leaf spring 38 under compression is located beneath the radial inward face of each of the clutch members and held in contact with the radial inward face of flange 32 by means of the same screw 37 that connects the clutch member to flange 32. Since the leaf springs are under compression, they will bear against the undersurface of the heads of screws 37 to tension the latter and will thus tend to pull the associated clutch members fixed thereto inwardly to a non-engaging position determined, in part, by the radial location of flange 32 with respect to the housing as shown in Fig. 6. It will be clear that the arrangement thus described also constitutes means that allows for an instantaneous automatic disengagement of the clutch members in the event that the power supply to shaft 1 is suddenly cut off, and in this respect permits free wheeling of the final driven member without dependence upon a corresponding manual manipulation of clutch disengaging means.

Mention was previously made of the fact that the threaded bore in each of the clutch members was displaced away from the center of gravity thereof for reception of the screw 37 which integrates flange 32, spring 38, and the associated clutch member. The two-fold purpose of this specific displacement and location of parts will now be considered, but first it should be mentioned that in order to eliminate as much frictional contact as possible between the clutch members and facing portion 22 of the driven plate 21, particularly during automatic clutch disengagement, means are afforded whereby these two are maintained substantially out of contact. Thus, referring to Figs. 1, 2 and 3, it will be seen that these means are shown as suitably comprising a rigid member 39 consisting of a disc-shaped portion 43 and, as additional seating means for the clutch members, a plurality of angled fingers 42 each integral with said portion. Member 39 may be conveniently formed by first stamping out radial portions so as to define a plurality of fingers radiating from a solid annular portion, and then shaping the resulting plate to conform substantially to the showing in Figs. 2 and 3. The disc-shaped portion of member 39 is disposed within an annular recess provided in the backs of the respective clutch members, while the angled fingers 42 are extended under the bottom of the clutch members, near the trailing edge as shown in Fig. 3, and thence into contact with driving plate 24, as shown in Figs. 1 and 2. Screws 25 are shown as extending through apertures in the radial inward extension of these fingers, and in this manner member 39 is also integrated with the driving means 1—3—24. Thus, the facing portions of plates 21 and 24 define the sides of the clutch housing, while annular portion 23 and the two seating means define the top and bottom respectively of the clutch housing. Fig. 3 shows the clutch members in coupling position with shoes 35 engaging the inner periphery of annular portion 23 of plate 21 thus to drive the latter in a clockwise direction, and it will be observed that flanges 32 are located near the leading edge of the clutch members while fingers 42 of member 39 are located near the trailing edge.

Referring back now to the positioning of flange 32, spring 38 and screw 37 with respect to the center of gravity of the associated clutch member, the long arrow in Figs. 3 and 7 indicates an assumed clockwise rotation of main drive shaft 1 and therefore a similar rotation of the clutch members 30 and 31. Fig. 6 shows the clutch members at rest in their radial inward and disengaged position, Fig. 7 illustrates the commencement of differential clutch engagement, and Fig. 3 shows the clutch members in fully engaged position to drive plate 21. In each of these figures there is shown an angled lug 40 fast within the clutch housing and in contact with the trailing edge of each of the clutch members 30 and 31. These lugs suitably represent pressed out and rolled up portions of driving plate 24, leaving openings 41 therein as shown in Fig. 5. In Fig. 6, wherein the clutch members are shown at rest in a disengaged position with respect to the annular portion 23 of driven plate 21, it will be seen that compression spring 38, adjacent the leading edge of the clutch member 30, has assumed its greatest degree of curvature in seating the clutch member on flange 32 and the seat portion of member 39. Now, when shaft 1 begins its clockwise rotation upon being energized by the main power supply, clutch members 30 and 31 will also be rotated due to their screw connection with flange 32 which is integral with driving plate 24. However, the clutch members having been at rest tend to remain at rest due to their inertia with respect to rotation, and consequently they will immediately exert a counter-clockwise thrust against lugs 40 which in turn, due to their being disposed at an angle of approximately 30° with respect to the trailing end of each of the clutch members, set up an opposing clockwise component tending to wedge the clutch members into engagement with the annular portion 23 of driven plate 21. This display of counter-clockwise thrust and clockwise reaction occurring at the lugs 40 conditions the clutch members for their initial, differential driving engagement which will now be described.

Once the clutch members attain a rotational speed sufficient to establish a centrifugal force in excess of the inward pull exerted by springs 38, this force will be effective to establish a torque that causes each clutch member, in its resultant outward radial movement, to pivot clockwise, as viewed from Fig. 7, about the extreme leading edge of its associated flange 32 with a concomitant initial engagement of the trailing edge of shoe 35 with the inner periphery of the annular portion 23 of driven plate 21, and this is due to the fact that screw 37 is positioned away from the center of gravity of clutch member 30. It must be borne in mind that the thrusts, reactions, torques, and slight movements discussed thus far are acting simultaneously, and it will be apparent then that the reaction set up in lug 40, heretofore mentioned, will aid in establishing a firm and steady clutch engagement at the initial point on the trailing edge of friction lining 35. In order to allow for the slight pivoting action about the leading edge of flange 32 and to eliminate the possibility of any binding, the diameter of apertures 36 are made larger than the diameter of screws 37. Once the initial, point-to-point clutch engagement has been established and spring 38 has correspondingly flattened out somewhat as shown in Fig. 7, the pivot is at once shifted from the leading edge of flange 32 back to lug 40, but the end of the torque arm remains at the same point, namely, the center of gravity of the clutch member. Now as centrifugal force increases, pivoting will emanate from lug 40, spring 38 will continue to be flattened out, and shoe 35 will continue to be wedged steadily and firmly into driving engagement with driven plate 21. In this manner, a differential clutch engagement is made possible which provides for a smooth, progressive, point-to-point contact, a firm and steady loading, and a clutch engagement which is free from chatter. It will also be apparent that the same general type of pivoting will take place during disengagement of the clutch, and it need only be mentioned that during this phase of clutch action, angled lugs 40 function to ease the clutch members into their respective seats and to resist the strong inward pull of spring 38 which would otherwise result in a sudden, jarring withdrawal of the clutch members from their outermost engaged position. While it is apparent that the presence of the angled wedging lugs 40 is not absolutely essential to a successful engagement of the clutch members, it will be clear that they have a highly desirable function in a clutch arrangement of this type and consequently their presence is to be preferred.

Reference was previously made to the fact that the specific location of flange 32 and spring 38 with respect to the center of gravity of the clutch members serves a two-fold purpose. Having considered the first purpose, the second will now be discussed, namely, to permit utilization and location of manually operated clutch engaging means that afford the same type of clutch engagement and disengagement considered with respect to the automatic phase of operation.

Allusion was earlier made to manual operating means generally indicated at 50, and these means afford an arrangement of parts whereby the main power supply can be started by rotation imparted to the normally driven shaft 2, or, in the event that the main power supply is of an automatically actuatable type, an arrangement of parts whereby the clutch members 30 can be engaged at speeds which are insufficient to create enough centrifugal force to cause automatic clutch engagement. Generally speaking, the manual means 50 comprises a tension cable or cord 11 which, when pulled and locked into its actuating position, causes the clutch-housing extensions of levers 60 to be rocked radially outwardly when viewed from Fig. 1, about their supports in driving plate 24 to force clutch members 30 into engagement with plate 21. More specifically, the manual means comprises fixed pins 56 and 57, and lever actuating means freely journaled about the main bearing housing 10 so as to be movable a predetermined distance in the direction of the clutch housing to pivot levers 60, the ends of levers 60 adjacent the main bearing housing being disposed within the path traced out by the actuating means 58 and 59.

Referring now to Figs. 1, 2 and 5, a plurality of actuating pins 56 and 57 are shown as threadably retained and radially mounted in the main bearing housing 10 of the driving shaft 1. Of course it will be understood that the main shaft 1 may actually become a driven member itself, depending upon the purpose to which the manual clutch engaging means are put as hereinbefore suggested, "driving" and "driven" being relative terms only depending upon the phase of operation. Each of the actuating pins has a reduced portion projecting therefrom in the direction of the clutch housing 20, the ends of which are seated on camming means in the form of slots 55 in actuating disc 58 and projecting from the back thereof as shown in Fig. 2. As with the actuating disc 58, actuating disc 59 is freely journaled concentrically about the bearing housing 10 and is free to be moved thereon by disc 58, with which it is normally in contact, to impart its movement to levers 60 so as to pivot the latter and force the clutch members into engagement with plate 21. Disc 58 is held in its normal or non-actuated location by means of spring 14, Fig. 5, which maintains the shoulders at the deep ends of slots 55 in contact with the reduced portions of pins 56 and 57. The manner in which disc 58 is rotated against the action of spring 14 during manual engagement of the clutch members 30 will now be described.

Viewing the manual operating means of the present invention from Fig. 5, it will be seen that one end of the cable 11 is linked to a pin 13 which projects from actuating disc 58 in the direction of the main bearing housing, and in order that the tension exerted by the operator on cable 11 will be as effective as possible, the cable is preferably run through a hole in actuating pin 56, Figs. 1 and 2. The clutch members 30 are manually engaged by pulling on cable 11 so as to rotate actuating disc 58 in the direction of the arrows of Fig. 5 and against the action of spring 14 heretofore described. This counter-clockwise movement of disc 58 causes the shallow portions in slots 55 to cam against the ends of the fixed pins 56 and 57 to force disc 58 forward along the main bearing housing 10 in the direction of levers 60. The weight of the clutch members 30 is not great enough to resist the camming action of the slots 55 during tensioning of the cable 11, and consequently the forward movement imparted to actuating disc 58 causes actuating disc 59 to be firmly pressed against the bearing-housing extensions of levers 60 to rock the latter in a direction which forces the clutch members 30 and the shoes carried thereby into engagement with plate 21. On the other hand, when cable 11 is loose in a non-actuated position, the only rotational force extant in disc 58 is that exerted by spring 14 on pin 15, Fig. 5, which tends to rotate disc 58 in a clockwise direction. Accordingly, if it be assumed that the clutch members have been drawn inwardly by springs 38, the unbalanced weight of the clutch members 30 bearing on the clutch-housing extensions of levers 60 necessarily pivots them radially inwardly resulting in actuating discs 58 and 59 being moved along the main bearing housing in a direction away from the clutch housing. This latter longitudinal movement imparted to disc 58, together with the clockwise movement imparted thereto by spring 14, places the shoulders at the deep ends of cam slots 55 in contact with fixed pins 56 and 57, and disc 58 is thus positioned for its most effective movement when it is desired to manually actuate the clutch members 30.

For purposes of illustration, the manual operating means has been described as applied to a pair of clutch members 30, but it is obvious that one alone, or all of the clutch members, may be similarly designed for manual engagement. Since the recess 33 in clutch member 30 for reception of the clutch engaging end of lever 60 is located slightly off center, it follows that the same general type of differential engagement between shoe 35 and the inner periphery of radial portion 23 of plate 21 will take place as was described in connection with automatic clutch engagement. Thus, if it is desired to freely "wheel" shaft 2, which is ordinarily a driven member, in order to impart a similar rotation to shaft 1, cable 11 is tensioned and locked to rotate disc 58 in a counter-clockwise direction against the action of spring 14. This movement of disc 58 is accompanied by a concomitant lateral movement thereof along the main bearing housing in the direction of clutch housing 20, forcing disc 59 against the bearing-housing extensions of levers 60, and the latter are thereby pivoted forcing clutch members 30 into differential point-to-point engagement with plate 21 in the same manner as heretofore described in connection with centrifugal actuation. Since plate 21, normally a driven member, is secured to shaft 2 which is now being "wheeled," the rotary movement in plate 21 is transmitted to shaft 1 through the clutch coupling. Lugs 40, while not capable of exerting any latent thrust in the direction of shoes 35 at the stage of operation, will, nevertheless, exert their wedging action against these shoes once the latter make their initial point-to-point contact with radial portion 23, and again the clutch loading, while manually accomplished, will be firm, steady, and free from chatter. On the other hand, if it is desired to manually engage clutch members 30 at a speed of driving shaft 1 which is too low to create enough centrifugal force in the clutch members to overcome the inward pull of springs 38, then, due to the fact that the clutch members are necessarily rotating, latent thrust actions and reactions will again occur at the lugs, and this time during the manual phase of operation.

Viewing the clutch assembly of the present invention as a whole, it will be seen that a focal point of operation lies with the spring means being located adjacent the leading end of the associated clutch member, effective to act against centrifugal force therein and functioning to promote a pivoting action of the clutch member during engagement thereof. Further, the location of the seating means for the clutch member within the clutch housing permits an assemblage of manual clutch engaging means that are arranged to produce the same type of differential clutch engagement that occurs during the automatic or centrifugal phase. Finally, the manual engaging means are so mounted and arranged as to permit various types of drives and to allow clutch engagement with a minimum number of moving parts, while at the same time affording an efficient loading.

In order that the overall operation of the instant clutch assembly can be visualized from a practical standpoint, its operation in combination with a motorbike in which the clutch assembly is located on the right-hand side thereof will be briefly outlined. The bike is pedalled in a conventional manner until the chain and sprocket drive connected to the rear wheel has established a sufficient momentum in plate 21 to turn over main shaft 1. At this point, tension cable 11 is locked into its engaged or actuated position by the operator whereupon disc 58 is actuated causing levers 60 to urge clutch members 30 into engagement with annular portion 23 of plate 21 to pick up the momentum of the latter. Since only two of the four clutch members are thus motivated, their loading will be relatively heavy, and this together with inherent differential or point-to-point clutch engagement within the housing 20 results in a coupling that exhibits little tendency to "jerk" the operator in his seat. Once the motor has been turned over and energized due to the connection between clutch members 30 and main shaft 1, cable 11 can be disengaged; clutch members 30 and 31 having assumed in the meantime their normal or automatically engaged position due to the fact that shaft 1 is now driven at a sufficient speed from the main power supply. In case the operator desires to slow down to a speed that would ordinarily result in a disengagement of the clutch members due to the influence of compression spring 38, the manual clutch engaging means can again be actuated to maintain shaft 2 in a driven condition. Finally, in the event of a sudden cessation of power in the main power supply, the clutch members will be immediately seated in their innermost radial position and out of engagement with plate 21 due to the fact that there is no longer any centrifugal force in said clutch members acting against the inward pull of springs 38. In this respect, the clutch of the present device affords a safety feature which permits free wheeling of the motorbike and prevents the rider's being thrown.

From the foregoing, it will be seen that the present invention affords a convenient arrangement of novel parts in a minimum of space and utilizes the least number of moving parts to provide a maximum number of driving and driven operational phases. In addition, clutch engagement is free from chatter during all operational phases, and while loading may be relatively light in some applications, nevertheless, it is firm and steady and exhibits substantially no sudden, jerky effects.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a centrifugal clutch assembly, a driving plate adapted to be coupled to a driven plate, a plurality of centrifugally actuatable clutch segments arranged in substantial end-to-end relation with respect to one another for engaging said driven plate and each being mounted adjacent the radial inward face of the leading end portion thereof to a mounting flange carried by said driving plate for movement therewith, a spring action at the inner side of each of said mounting flanges tending to draw said clutch segments inward toward the outer side of said mounting flanges and against centrifugal forces tending to initiate clutch engagement, said clutch segments each having but a single radially inwardly inclined projection at their trailing ends each engaged by an inclined wedge action lug fixed in position to said driving plate for driving movement therewith, said wedge action lugs each being inclined at an angle the same as that of said inclined projections to exert a radial outward thrust on the trailing ends of the clutch segments, said clutch segments each being otherwise drivingly unconnected to said driving plate whereby the clutch segments, during actuation, will first pivot outwardly about said mounting flanges as a fulcrum at their said leading ends and against said spring action until the clutch segments are engaged at their trailing ends whereupon the clutch segments then progressively pivot outwardly into differential clutch engagement about said lug elements as a fulcrum.

2. In the centrifugal clutch assembly according to claim 1, predetermined ones of said clutch segments being engaged at their respective undersides by one end of a clutch actuating lever pivoted on said driving plate, the other end of said lever being disposed in position to be engaged and forceably pivoted in a clutch engaging direction to force the corresponding clutch segment into engagement with said driven plate, a rotatable disc arranged with said assembly on a support for movement in the direction of said other end of said actuating lever to force the same in said clutch engaging direction, at least one cam slot formed in the face of said disc away from said driving plate the deep end of which slot is normally occupied by a forcing pin fixed on said support in normal relation to said cam slot, and means for turning said disc on said support in a direction such as to present the shallow end of the cam slot to the end of said pin whereby said pin forces said disc toward said other end of said lever to pivot the same in said clutch engaging direction therefor.

3. In a centrifugal clutch assembly, a rotatable driving plate adapted to be clutch engaged with a rotatable driven plate, a plurality of centrifugally actuatable clutch segments arranged symmetrically between said discs for centrifugal actuation to couple the driven to the driving plate, said segments each being mounted at their radial inner faces to a reaction flange carried by the driving disc plate for rotatable movement therewith, said connections each affording a centrifugal outward pivoting action for the clutch segments and a spring action at the underside of the flange elements for urging the clutch segments inwardly out of clutch engagement and into engagement with the outer sides of said flange elements against centrifugal forces tending to initiate clutch actuation, and a wedge acting element associated with each clutch segment and fixed in position to the driving plate for exerting a radial outward thrust against the trailing end of each of the clutch segments during clutch actuation, the trailing end of each clutch segment adjacent the radial outward face thereof being formed with a single projection that is inclined radially inwardly in the direction of said flange elements, said wedge acting elements each being inclined at the same angle as said inclined projections, said clutch segments each being otherwise drivingly unconnected to and unrestrained in a circumferential direction by said driving plate whereby the clutch segments, during actuation, first pivot about said connections at their leading ends into engagement with said driven plate whereupon the clutch segments then progressively engage from the trailing ends forwardly to the leading ends into differential clutch engagement about and under the influence of said wedge acting elements as wedging fulcrums.

4. In the centrifugal clutch assembly according to claim 3, predetermined ones of said clutch segments being engaged at their respective undersides by one end of a clutch actuating lever pivoted on said driving plate, the other end of said lever being disposed in position to be engaged and forceably pivoted in a clutch engaging direction to force the corresponding clutch segment into engagement with said driven plate, a rotatable disc arranged with said assembly on a support for movement in the direction of said other end of said actuating lever to force the same in said clutch engaging direction, at least one cam slot formed in the face of said disc away from said driving plate the deep end of which slot is normally occupied by a forcing pin fixed on said support in normal relation to said cam slot, and means for turning said disc on said support in a direction such as to present the shallow end of the cam slot to the end of said pin whereby said pin forces said disc toward said other end of said lever to pivot the same in said clutch engaging direction therefor.

5. In a centrifugal clutch assembly, a clutch housing including a driving plate adapted to be coupled to a driven plate, a plurality of centrifugally engageable and actuatable clutch segments arranged within said housing in substantial end-to-end relationship for drivingly engaging said driven plate, each of said clutch segments being connected at the radial inward face of the leading end portion thereof to a mounting flange formed integrally with said driving plate and affording a pivot for the respective clutch segments, each such connection being maintained under tension by a leaf spring engaged at the underside of the mounting flange and which tends to resist centrifugal actuation and draw the corresponding clutch segment in against the outer face of the mounting flange, and inclined lugs on said driving plate disposed in engagement with radially inwardly inclined projections on the trailing ends of the clutch segments adjacent the radial outward faces thereof, said lugs and projections being inclined at a common angle such as to cause an outward thrust to be applied to the clutch segments at the trailing ends thereof during clutch actuation, said clutch segments being otherwise drivingly unconnected to and unrestrained in a circumferential direction by said driving plate.

6. In the clutch assembly according to claim 5, predetermined ones of said clutch segments being engaged at their respective undersides by one end of a clutch actuating lever pivoted on said driving plate, the other end of said lever being disposed in position to be engaged and forceably pivoted in a clutch engaging direction to force the corresponding clutch segment into engagement with said driven plate, a rotatable disc arranged with said assembly on a support for movement in the direction of said other end of said actuating lever to force the same in said clutch engaging direction, at least one cam slot formed in the face of said disc away from said driving plate the deep end of which slot is normally occupied by a forcing pin fixed on said support in normal relation to said cam slot, and means for turning said disc on said support in a direction such as to present the shallow end of the cam slot to the end of said pin whereby said pin forces said disc toward said other end of said lever to pivot the same in said clutch engaging direction therefor.

7. In a centrifugal clutch assembly having a plurality of clutch segments arranged in a housing for actuation in a clutch engaging direction outwardly of the center of the housing to engage and impart driving movements to a driven member of the clutch assembly, a driving shaft, a main support for the driving shaft, a clutch actuating lever pivoted at a point on said housing with one end thereof extended through said housing into engagement with the underside of a corresponding clutch segment and the other end extended toward said main support in position to be forceably engaged and pivoted in a clutch engaging direction toward said clutch housing to actuate and move said corresponding clutch segment in the said clutch engaging direction therefor, a rotatable disc located on said support behind said other end of said lever and adapted to move in the direction of said other end of said lever, said disc being formed with at least one cam slot in which the deep end thereof is normaly occupied by the end of pin fixed to said main support to extend in a right angle relation to said rotatable disc, and means for turning said disc to present the shallow end of the slot to said end of the pin whereby said disc is forced toward said other end of said lever to pivot the same in a clutch engaging direction.

8. In a centrifugal clutch assembly having a plurality of clutch segments arranged in a housing for actuation in a clutch engaging direction outwardly of the center of the housing to engage and impart driving movements to a driven member of the clutch assembly, a driving shaft, a main support for the driving shaft arranged concentrically thereabout, a clutch actuating lever pivoted at a point on said housing with one end thereof extended through said housing into engagement with the underside of a corresponding clutch segment and the other end extended toward said main support in position to be forceably engaged and pivoted in a clutch engaging direction toward said clutch housing to actuate and move said corresponding clutch segment in the said clutch engaging direction therefor, a rotatable disc arranged on said support in normal relation thereto for forceable movement in the direction of said other end of said lever, said disc being formed with a plurality of circumferentially arranged and spaced apart cam slots the deep ends of which slots are normally occupied by the free ends of corresponding forcing pins fixed on said support to extend in a right angle relationship to the plane of said rotatable disc, and manually controlled means for turning said disc in a direction to bring the shallow ends of said slots around to the ends of said pins whereby said disc is forced and advanced by said pins along said support in the direction of said other end of said lever to cause said lever to pivot in the said clutch actuating direction therefor.

References Cited in the file of this patent

UNITED STATES PATENTS

| Number | Name | Date |
|---|---|---|
| 1,279,906 | Read et al. | Sept. 24, 1918 |
| 1,727,467 | Johnson | Sept. 10, 1929 |
| 1,801,471 | Wersall | Apr. 21, 1931 |
| 2,058,736 | Stauffer et al. | Oct. 27, 1936 |
| 2,087,968 | Dodge | July 27, 1937 |
| 2,375,909 | Fawick | May 15, 1945 |
| 2,465,701 | Wachs | Mar. 29, 1949 |
| 2,529,919 | Cunningham | Nov. 14, 1950 |

FOREIGN PATENTS

| Number | Country | Date |
|---|---|---|
| 886,762 | France | Oct. 25, 1943 |
| 601,354 | Great Britain | May 4, 1948 |